United States Patent

Kono

[11] Patent Number: 6,139,593
[45] Date of Patent: Oct. 31, 2000

[54] MANUFACTURING METHOD OF ANODE BODY OF SOLID ELECTROLYTIC CAPACITOR

[75] Inventor: Takashi Kono, Toyama, Japan

[73] Assignee: NEC Corporation, Tokyo, Japan

[21] Appl. No.: 09/182,094

[22] Filed: Oct. 29, 1998

[30] Foreign Application Priority Data

Nov. 6, 1997 [JP] Japan ................................. 9-304072

[51] Int. Cl.[7] .............................. H01G 9/00; H01G 9/042
[52] U.S. Cl. ...................... 29/25.03; 361/523; 361/529
[58] Field of Search ..................... 29/25.03; 361/529, 361/523

[56] References Cited

U.S. PATENT DOCUMENTS

| | | | |
|---|---|---|---|
| 4,468,719 | 8/1984 | Shimizu et al. | 361/433 |
| 4,517,727 | 5/1985 | Shimizu et al. | 29/570 |
| 4,574,333 | 3/1986 | Snyder | 361/433 |
| 5,486,977 | 1/1996 | Hasegawa | 361/529 |
| 5,667,536 | 9/1997 | Hasegawa | 29/25.03 |

FOREIGN PATENT DOCUMENTS

| | | |
|---|---|---|
| 098149 | 11/1984 | European Pat. Off. . |
| 56-120119 | 9/1981 | Japan . |
| 1-181509 | 7/1989 | Japan . |
| 4-167512 | 6/1992 | Japan . |
| 4-279020 | 10/1992 | Japan . |
| 6-176985 | 6/1994 | Japan . |

Primary Examiner—John F. Niebling
Assistant Examiner—Ha Tran Nguyen
Attorney, Agent, or Firm—Young & Thompson

[57] ABSTRACT

A manufacturing method of an anode body of a solid electrolytic capacitor which, for improving the embedded strength of the anode lead with reduced leakage current, successively throws two kinds of valve action metallic powders with different melting-down properties into a single-step press manufacturing die so as to be arranged with the valve action metallic powder whose melting-down property is larger in the neighborhood of the embedded surface of the anode lead.

9 Claims, 11 Drawing Sheets

SKEMATIC VIEW SHOWING
FIRST PRESS FORMING CONDITION

FIG. 4B PRIOR ART

SKEMATIC VIEW SHOWING
SECOND PRESS FORMING CONDITION

FIG. 4C PRIOR ART

SKEMATIC VIEW SHOWING
THIRD PRESS FORMING CONDITION

FLOW CHART SHOWING MANUFACTURING PROCESS OF ANODE BODY ELEMENT OF SOLID ELECTROLYTIC CAPACITOR

MANUFACTURING METHOD OF ANODE BODY OF SOLID ELECTROLYTIC CAPACITOR

BACKGROUND OF THE INVENTION

The present invention relates to a method of manufacturing an anode body of a solid electrolytic capacitor. More particularly, this invention relates to a manufacturing method of an anode body of a solid electrolytic capacitor in which the embedded strength of an anode lead line is improved.

DESCRIPTION OF THE PRIOR ART

In the manufacturing of the anode body which is used for the solid electrolytic capacitor, valve action metals such as Tantalum, Titanium, Niobium and so forth are used for the anode body. These valve action metals which are to be subjected to pressurization forming, form the anode body. At this time, it is necessary to form a construction of embedded lead line on the side of anode at the anode body.

Figure 1A:
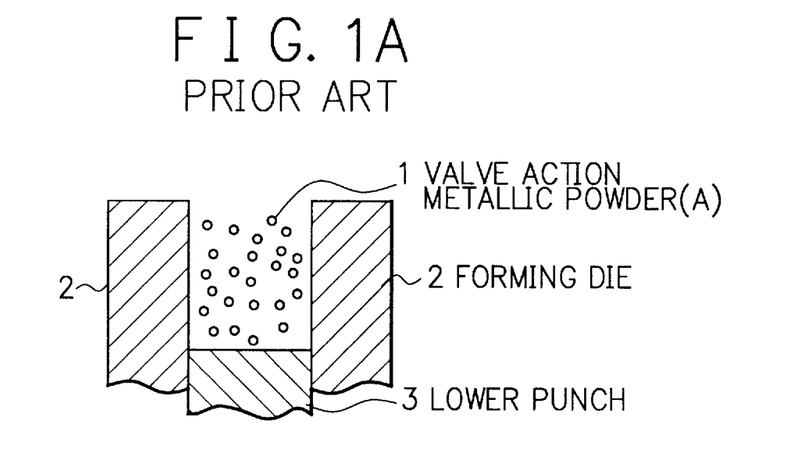
FIGS. 1A to 1C are process view showing conventional manufacturing method of anode body of a solid electrolytic capacitor according to only one time forming.
Figure 1B:
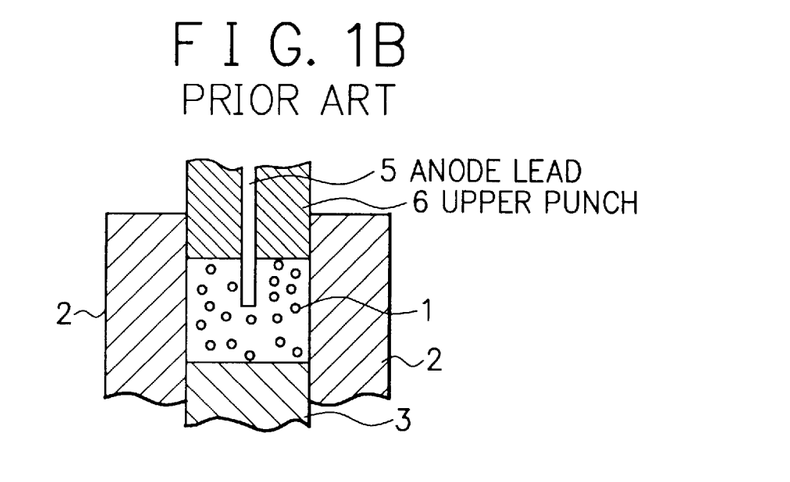
Figure 1C:
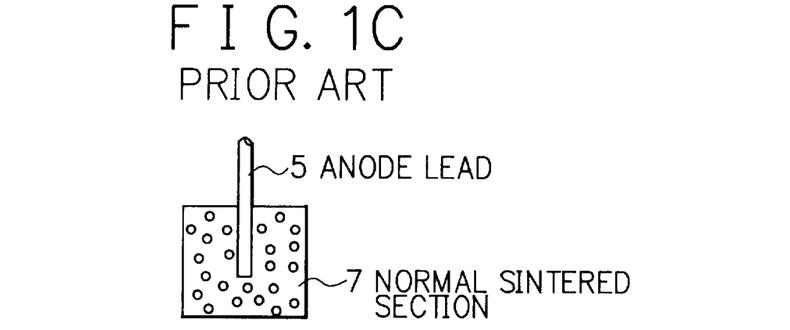

FIGS. 1A to 1C are process views showing a conventional manufacturing method of the anode body of the solid electrolytic capacitor. In the conventional method, firstly, valve action metallic powder 1 corresponding to weight of the plan of the anode body is thrown into the concave portion bounded by the forming die 2 of the press forming metal and the lower punch 3 inserted thereto (FIG. 1A), next, there is implemented press manufacturing such that it causes the upper punch 6 and the lower punch 3 to approach under the condition that the anode lead 5 is bedded in the valve action metallic powder 1 (FIG. 1B). Thus, the anode body is formed by sintering the formed body (FIG. 1C). In this conventional method, since the forming is completed by only one pressurization, it is necessary to enlarge the compression ratio to increase forming density for guaranteeing sufficient body strength. On the other hand, to increase forming density brings difficulty of forming semiconductor layer sufficiently into inside of formed body in the next forming process of semiconductor layer. It is connected with lowering of capacity of the solid electrolytic capacitor or increase of resistance in the inside, and outside of the semiconductor layer. Thus these come to negatively effect electric characteristics.

Figure 2:
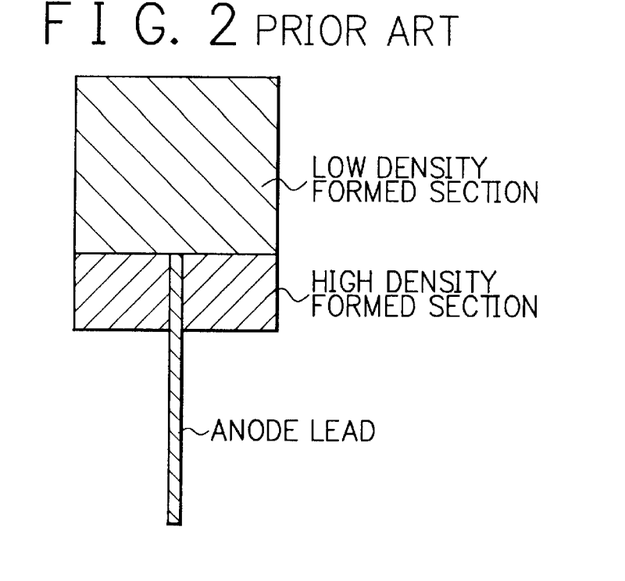
FIG. 2 is a schematic view showing conventional manufacturing method of an anode body of a solid electrolytic capacitor denoted by the Japanese Patent Application Laid-Open No. 4-167512.
Figure 3A:
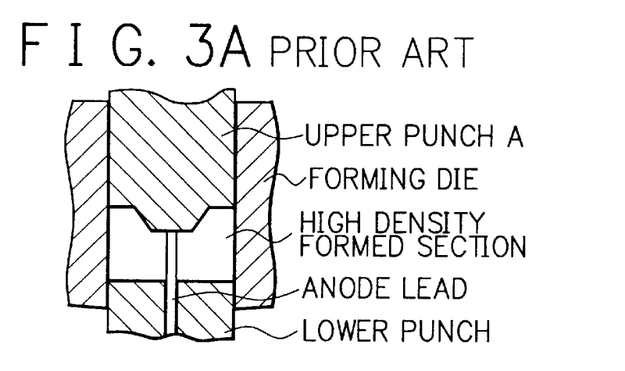
FIGS. 3A and 3B are process views showing conventional manufacturing method of an anode body of a solid electrolytic capacitor denoted by the Japanese Patent Application Laid-Open No. HEI 4-279020.
Figure 3B:
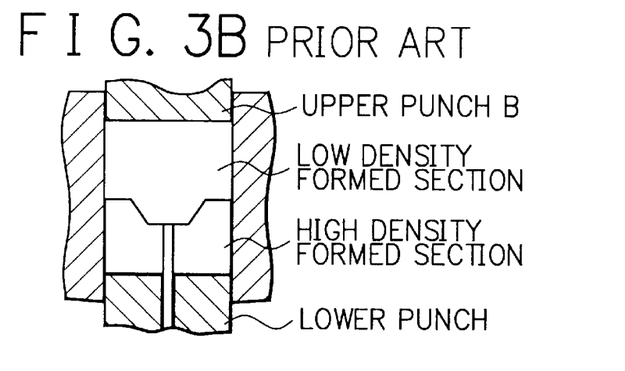

In regard to problems described-above, the Japanese Patent Application Laid-Open No. HEI 4-167512 and the Japanese Patent Application Laid-Open No. HEI 4-279020 disclose manufacturing methods of the anode body of the solid electrolytic capacitor in such a way that there is manufactured the anode body element having a section of easily forming semiconductor layer with low forming density, and a lead embedded section whose forming density is high and whose forming body strength is durable by dividing the valve action metallic powder, then implementing a plurality of pressurized forming with the compression ratio being varied, as shown in respective FIGS. 2 and 3.

Figure 4A:
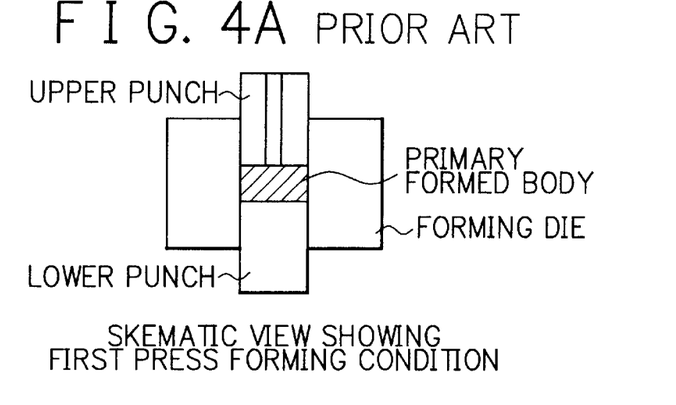
FIGS. 4A to 4C are process views showing conventional manufacturing method of an anode body of a solid electrolytic capacitor denoted by the Japanese Patent Application Laid-Open No. HEI 1-181509.
Figure 4B:
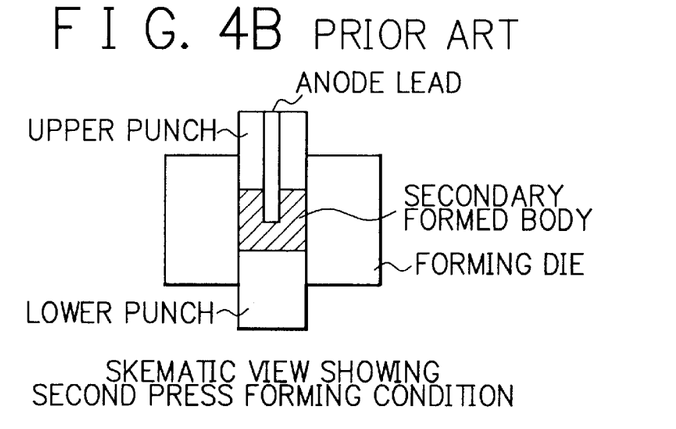
Figure 4C:
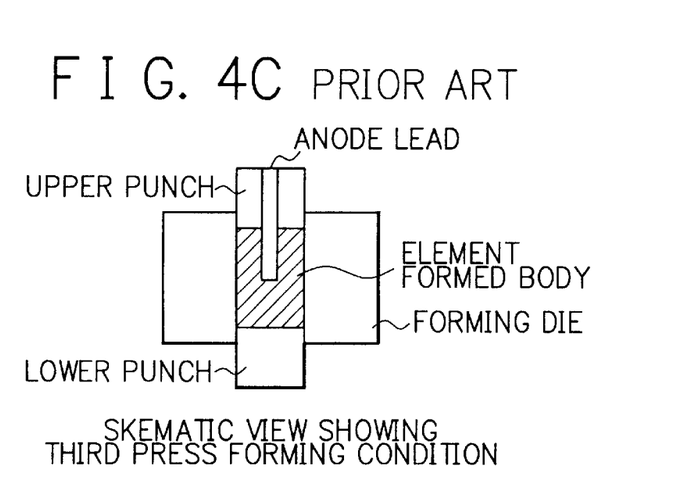
Figure 5:
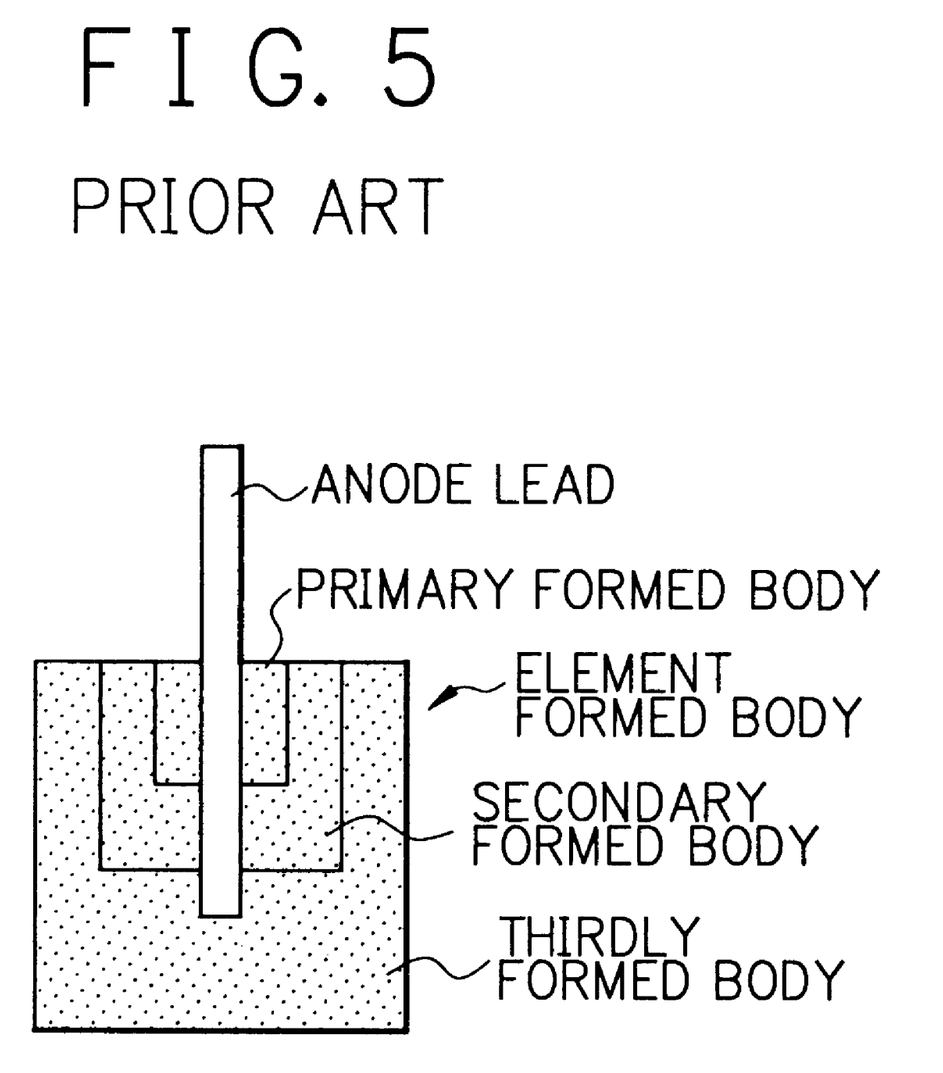
FIG. 5 is a schematic view showing conventional manufacturing method of an anode body of a solid electrolytic capacitor denoted by the Japanese Patent Application Laid-Open No. 6-176985.

Further, the Japanese Patent Application Laid-Open No. HEI 1-181509 and the Japanese Patent Application Laid-Open HEI 6-176985 disclose technology simplifying forming of a semiconductor layer in that the valve action metal is divided, then having a plurality of press manufacturing, causing forming density of inside of the anode body element to be equalized by implementing pressurized forming of the anode body element successively as shown in respective FIGS. 4 and 5. In particular, the Japanese Patent Application Laid-Open No. HEI 6-176985 discloses technology of improving stress-resistance of the anode body element in that it enables embedded strength of the anode body element to be improved by forming the anode body element in such a way that forming of valve action metallic powder with layers so as to surround the previously embedded section of the anode lead successively, with the embedded section of the anode lead consisting of Tantalum as a core as shown in FIG. 5.

However, in the manufacturing method of the anode body of the solid electrolytic capacitor described-above, there are problems to be resolved as follows:

Firstly, in the conventional technology with one time forming, there is no means for forming the embedded portion of the anode lead of particularly high density. There is not obtained sufficient embedded strength of the anode lead of the anode body element when intending to form a low density section.

Next, as described in the Japanese Patent Application Laid-Open No. HEI 4-167512, the Japanese Patent Application Laid-Open No. HEI 1-181509, and the Japanese Patent Application Laid-Open No. HEI 6-176985, it becomes necessary to implement a plurality of press forming manufacturing steps when intending to improve embedded strength of the anode lead or to equalize density of the anode body element. For instance, it is necessary to implement press forming successively, while changing press dimensions and forming densities with embedded portion of the anode lead as a center, in addition thereto, implementing press forming of whole anode body element. Manufacturing time of the anode body of the solid electrolytic capacitor and manufacturing cost thereof greatly increases because it is necessary to prepare remarkably complicated apparatus and process.

SUMMARY OF THE INVENTION

In view of the foregoing, it is an object of the present invention to provide a manufacturing method of an anode body of a solid electrolytic capacitor which enables efficient manufacturing of an anode body of a solid electrolytic capacitor whose embedded strength of the anode lead is improved, as a result thereof it is capable of reducing inferior ratio of leakage current by way of electric characteristic of the solid electrolytic capacitor or deterioration thereof.

According to the first aspect of the present invention, for achieving the above-mentioned object, there is provided a manufacturing method of an anode body of a solid electrolytic capacitor comprising the steps of successively throwing more than two kinds of valve action metallic powders, whose sintering melting-down properties are different, into a press manufacturing die such that the valve action metallic powder whose melting property is large is arranged in the neighborhood of an embedded surface of an anode lead, implementing pressurizing by only one press manufacturing step, and forming an anode body by sintering.

According to the second aspect of the present invention there is provided a manufacturing method of an anode body of a solid electrolytic capacitor wherein there is implemented press manufacturing while throwing successively more than two kinds of the same valve action metallic powders whose particle diameters are different into press manufacturing die such that the valve action metallic powder whose particle diameter is finer is arranged in the neighborhood of an embedded surface of said anode lead.

According to the third aspect of the invention, there is provided a manufacturing method of an anode body of a solid electrolytic capacitor wherein there is used fine powder whose primary powder particle diameter is from more than 10 nm to less than 1 μm by way of the valve action metallic powder being arranged in the neighborhood of the embedded surface of the anode lead, and there is implemented the sintering process in such a degree that in the sintering process, the valve action metallic powder arranged in the neighborhood of the embedded surface of the anode lead is firmly fixed both to the anode lead and the other portions of the anode body in that the valve action metallic powder is melted down sufficiently to form a valve action metallic body whose body strength is high.

According to the fourth aspect of the present invention, there is provided a manufacturing method of an anode body of a solid electrolytic capacitor, using two kinds of valve action metallic powders where one is the valve action metallic powder arranged in the neighborhood of the embedded surface of the anode body and the other is valve action metallic powder whose primary powder particle diameter is from more than 0.5 μm to less than 100 μm.

According to the fifth aspect of the present invention, there is provided a manufacturing method of an anode body of a solid electrolytic capacitor, wherein there are a total of three kinds of valve action metallic powders in such a order that the upper part is occupied by the valve action metallic powder arranged in the neighborhood of the embedded surface of the anode lead, the lower part is occupied by the valve action metallic powder whose primary powder particle diameter is from more than 0.5 μm to less than 100 μm, and intermediate part therebetween is occupied by the valve action metallic powder whose primary powder particle diameter is an intermediate diameter between above-described two valve action metallic powders.

According to the sixth aspect of the present invention, there is provided a manufacturing method of an anode body of a solid electrolytic capacitor, wherein there is used Tantalum.

According to the seventh aspect of the present invention, there is provided a manufacturing method of an anode body of a solid electrolytic capacitor, wherein there is implemented press manufacturing while throwing more than two kinds of separate valve action metallic powders whose melting points are different into a press manufacturing die successively such that valve action metallic powder whose melting point is low is arranged in the neighborhood of the embedded surface of the anode body.

According to the eighth aspect of the present invention, there is provided a manufacturing method of an anode body of a solid electrolytic capacitor, wherein there are used two kinds of valve action metallic powders, Niobium powder being the valve action metallic powder arranged in the neighborhood of the embedded surface of the anode body, and Tantalum powder.

According to the ninth aspect of the present invention, there is provided a manufacturing method of an anode body of a solid electrolytic capacitor, wherein there are used three kinds of valve action metallic powders, titanium powder being arranged in the neighborhood of the embedded surface of the anode body, Tantalum powder, and Niobium powder.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

Preferred embodiments of the invention will now be described in detail referring to the accompanying drawings.
[EMBODIMENT 1]

Figure 6:
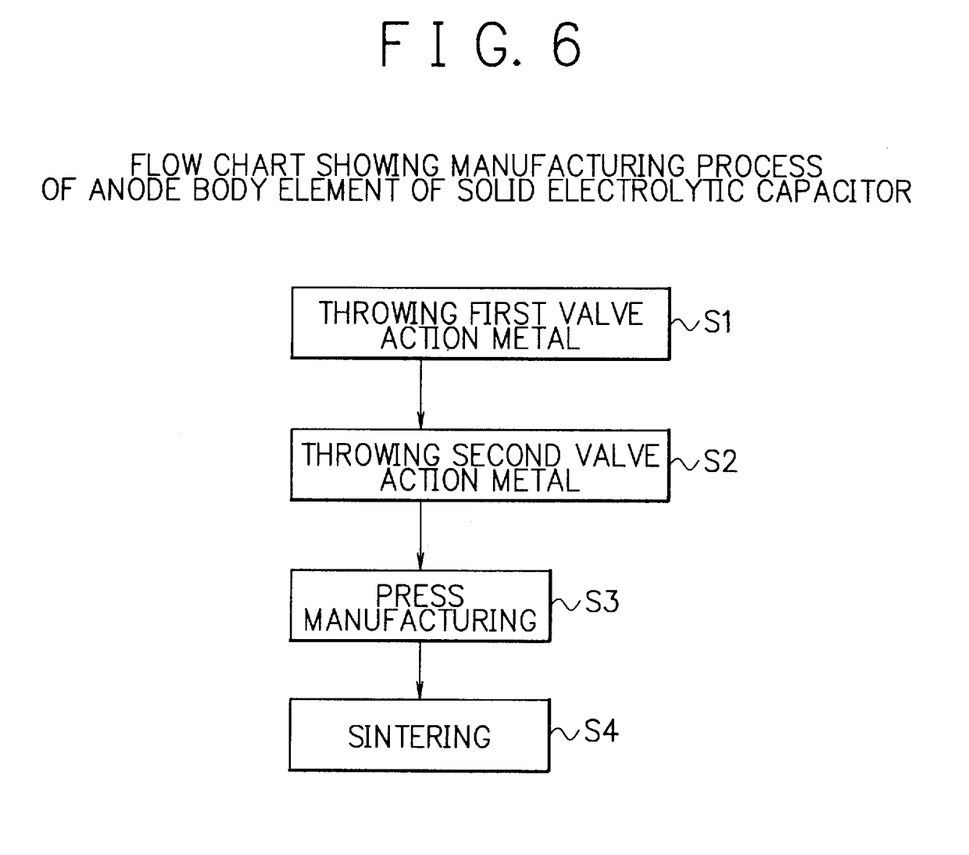
FIG. 6 is a flowchart showing manufacturing method of an anode body of a solid electrolytic capacitor according to an embodiment 1 of the present invention.

FIG. 6 is a flowchart showing a manufacturing method of an anode body of a solid electrolytic capacitor according to embodiment 1 of the present invention. In the manufacturing method of the anode body of the present embodiment 1, a first and a second valve action metallic powder are thrown successively (STEPs S1, S2), before press forming of the anode body is implemented by only a single pressing (STEP S3). Next, sintering is implemented under the condition of high temperature and high vacuum such as 1200 to 2000, and less than $10^{-3}$ Torr (STEP S4), thus obtaining the anode body element.

In embodiment 1, one kind of valve action metallic powder such as Tantalum, Niobium, and Titanium and so forth is used for the first and the second valve action metallic powder.

Particle diameter of a primary powder of the second valve action metallic powder is remarkably smaller than the particle diameter of a primary powder of the first valve action metallic powder. That is, the primary powder of the second metallic powder has a diameter ranging from scores to hundreds of nm. The particle diameter of the primary powder of the second valve action metallic powder is suitably less than 300 nm.

In terms of the first metallic powder, the particle diameter of the primary powder is 0.5 to scores of μm which is the same order as that of being utilized for the conventional anode body of the solid electrolytic capacitor. The primary powder coheres appropriately, and includes secondary powder of particle diameter ranging from several μm to hundreds of μm.

Next, operation of embodiment 1 will be described in detail referring to FIGS. 7A to 7D.

Figure 7A:
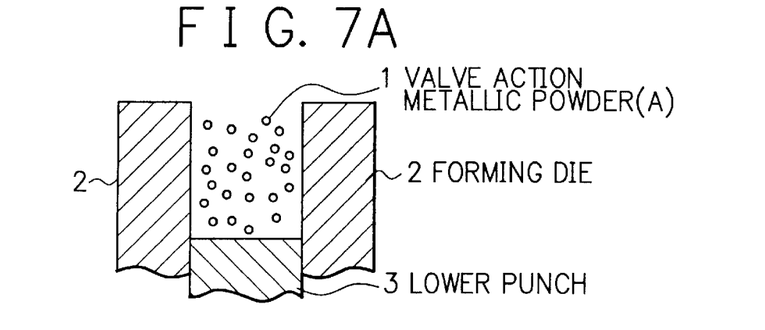
FIGS. 7A to 7D are process view showing manufacturing method of the anode body of the solid electrolytic capacitor according to the embodiment 1 of the present invention.

Firstly, the first valve action metallic powder (A) 1 corresponding to the weight of the main anode body is thrown (inserted) into the concave portion bounded by the forming die 2 of the press forming metal and the lower punch 3 inserted thereto (FIG. 7A).

Figure 7B:
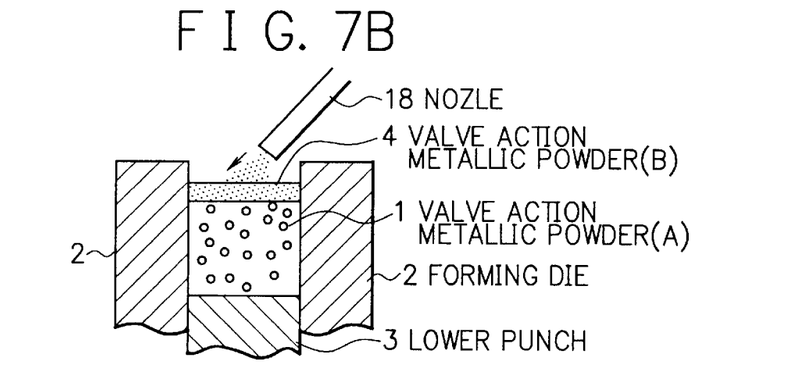

Next, there is thrown the second valve action metallic powder (B) 4 with fine particle diameter on the valve action metallic powder (A) 1 by means of a nozzle 18 and so forth. At this time, thrown weight of the valve action metallic powder (B) 4 is approximately 1% to 10% of the thrown weight of the valve action metallic powder (A) 1 (FIG. 7B). As can be seen from FIGS. 7A–7B, there is little intermixing between powder (A) and powder (B).

Figure 7C:
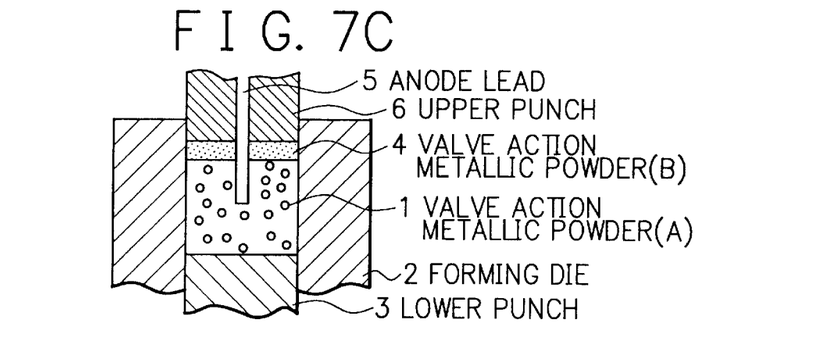

Next, there is implemented press manufacturing such that it causes the upper punch 6 and the lower punch 3 to approach under the condition that the anode lead 5 is bedded in the valve action metallic powder (A) 1, and penetrated to be embedded through the valve action metallic powder (B) 4 (FIG. 7C).

Figure 7D:
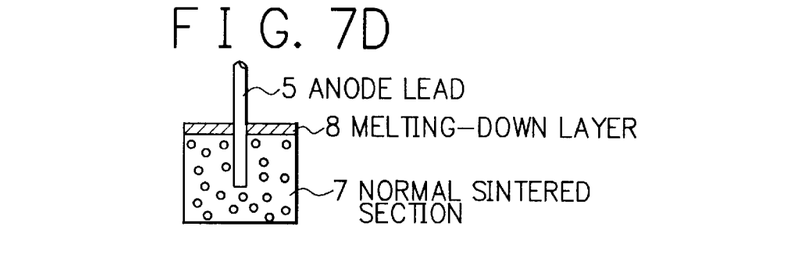

Subsequently, sintering is implemented under the condition of high temperature and high vacuum such as 1200 to 2000° C., and less than $10^{-3}$ Torr to the formed body after completing the press manufacturing. In this sintering process, sintering temperature, heating time and so forth are established toward the condition that it causes the valve action metallic powder (A) 1 to be sintered appropriately. Namely, capacity of the solid electrolytic capacitor is determined according to surface area of being generated when the valve action metallic powder (A) 1 is melted in some degree by the sintering process. Therefore, the sintering is implemented under the condition that the valve action metallic powder (A) 1 comes to be in a melting-down state corresponding to prescribed capacity. In such a sintering process, the valve action metallic powder (B) 4 whose particle diameter is smaller than the valve action metallic powder (A) 1 becomes a state close to a plate consisting of the valve action metal while progressing the melting-down state remarkably in comparison with the valve action metallic powder (A) 1, thus forming melting-down layer 8 with high strength and forming a body covering whole embedded surface of the anode lead 5 (FIG. 7D).

The melting-down layer 8 strongly locks with the anode lead 5 from melting, and also strongly locks with sintered section 7. Thus, the embedded strength of the anode lead is improved greatly. Further, when force is added to the anode lead 5, it is unlikely that damage will occur and cause leakage current at the boundary portion between the anode lead 5 and the melting-down layer 8. And the force propagates through strong fixed section to whole of the melting-down layer 8 with high strength formed body, thus it is capable of being avoided that stress converges on the boundary section between the anode lead 5 and the normal sintered section 7. Thus there is prevented generation of leakage current caused by the damage of boundary section of the anode lead 5 therebetween. Further, it is capable of preventing deterioration of characteristic of the leakage current and so forth caused by the damage in the normal sintered section 7, in cases where stress is added thereto from outer resin for packaging and so forth, because the anode body is formed so as to cover whole upper section of the normal sintered section 7 by the melting-down layer 8.

Furthermore, as described above, in the manufacturing method of the present invention, it is capable of realizing an improvement of embedded strength of the anode lead 5 without necessity of implementing a plurality of press forming process steps such as in conventional methods. The above described effect is obtained because of the remarkable melting-down state of the valve action metal in the neighborhood of embedded surface of the anode lead. It is capable of obtaining sufficient effect by only single press forming step even though quantity of valve action metal is a comparatively small quantity in the neighborhood of embedded surface of the anode lead.

Next, concrete embodiment of embodiment 1 will be described in more detail referring again to FIGS. 7A to 7D.

Tantalum powder whose average particle diameter of primary particle is of approximately 1.0 μm by way of the first valve action metallic powder (A) 1 is thrown into a die 2 having rectangular opening of 1.0×2.0 mm. At this time, throwing weight is approximately 250 mg. Next, there is dashed Tantalum fine powder whose average particle diameter of the primary particle is of approximately 50 nm on top of the valve action metal (A) 1 by way of the second valve action metallic powder (B) 4 through the nozzle 18 with hole diameter of 0.8 mmφ. At this time, the quantity of Tantalum fine powder is of 25 mg. There is added small vibration to the nozzle 18 at the time of dashing so that the valve action metallic powder (B) 4 is applied and covers uniformly on the valve action metallic powder (A) 1.

After dashing the Tantalum fine powder, the press manufacturing is implemented in such a way that it causes the nozzle 18 to back until appropriate position, before fitting the upper punch 6 maintaining Tantalum wire of 0.2 mmφ at the center by way of the anode lead 5 into the die 2, simultaneously, moving the lower punch 3 upward.

Figure 8:
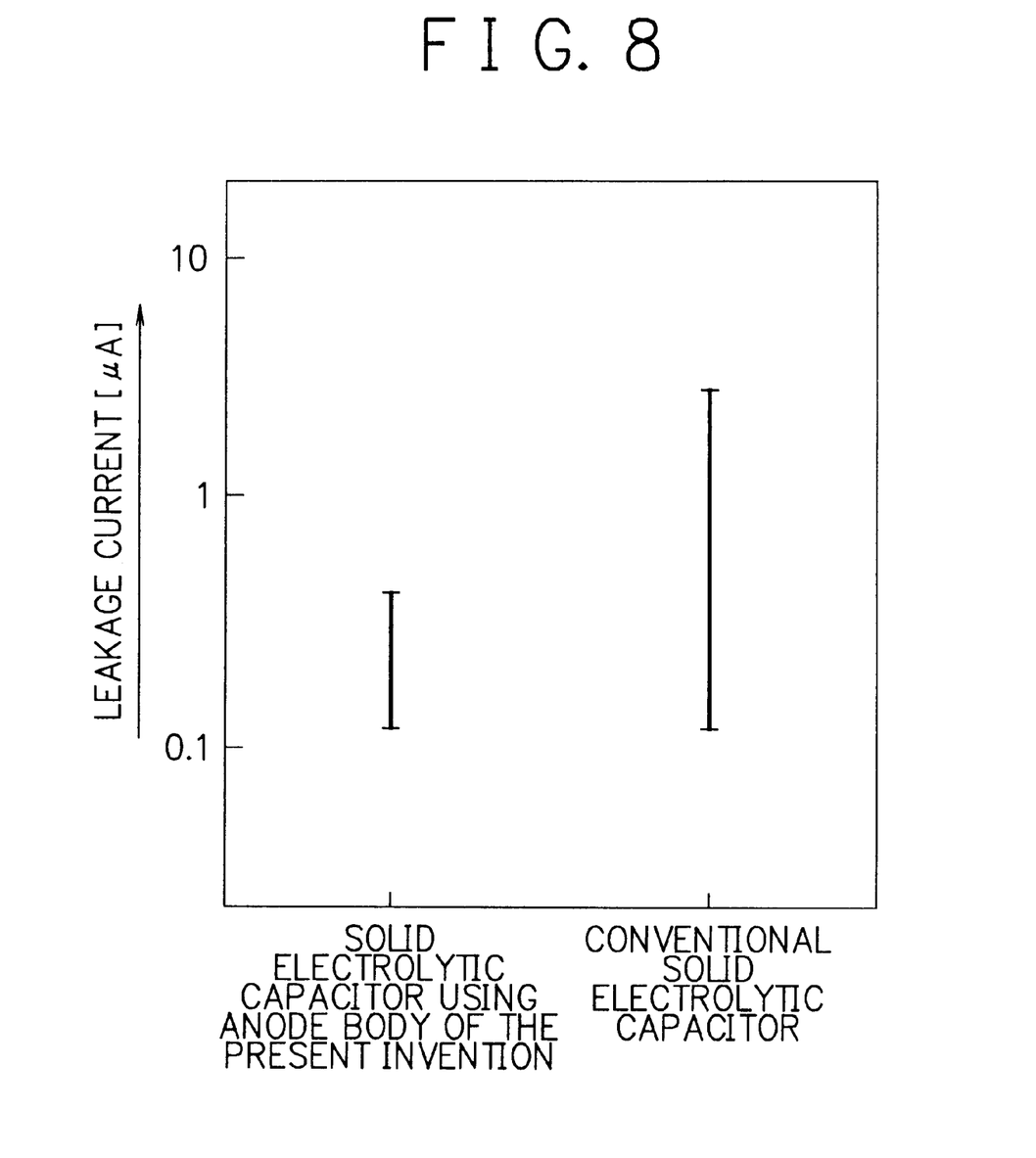
FIG. 8 is a graph showing reduction of leakage current of solid electrolytic capacitor according to manufacturing method of the anode body of the solid electrolytic capacitor of the present invention.

The formed body after press manufacturing is subjected to a sintering process, after cutting the anode lead 5 with appropriate length, before taking out of the press manufacturing machine. Here, a sintering condition is established appropriate for normal sintering of the valve action metallic powder (A) 1, by way of the sintering condition. This time, the sintering condition of 1500° C., $10^{-4}$ Torr, 30 minutes is used. During the time period of the sintering process, the melting-down layer 8 of Tantalum plate shape of degree of 0.1 mm thick is formed, while melting Tantalum fine powder remarkably (which powder is the second valve action metallic powder (B) 4). The melting-down layer 8 is strongly deposed with the normal sintered section 7 to which the anode lead 5 and the valve action metallic powder (A) 1 are sintered. There does not occur damage between the anode lead 5 and the melting-down layer 8, the stress is scarcely propagated toward the normal sintered section 7. For this reason, as shown in FIG. 8, the invention is capable of reducing the leakage current greatly in the finished products.

As shown in FIG. 7D, the anode body of the solid electrolytic capacitor of the concrete embodiment, there has the melting layer 8 at the embedded surface of the anode lead 5. In the present embodiment, there are used Tantalum powder of approximately 1.0 μm particle diameter of the valve action metallic powder (A) 1, and Tantalum powder of approximately 50 nm particle diameter of primary particle of the valve action metallic powder (B) 4. The melting-down layer 8 is formed from the Tantalum fine powder serving as the valve action metallic powder (B) 4 which in the sintering process takes on the Tantalum plate shape, with the anode lead 5 and the normal sintered section 7 are deposed strongly to layer 8. Thus there is achieved improvement of embedded strength of the anode lead 5 and prevention of deterioration of characteristic of the solid electrolytic capacitor caused by the outer stress because a melting-down layer 8 covering whole upper surface of the normal sintered section 7 is formed.

[EMBODIMENT 2]

FIGS. 9A to 9E are process views showing the manufacturing method of the anode body of the solid electrolytic capacitor according to embodiment 2 of the present invention.

In this embodiment, there is further improved fixed strength of the melting-down layer 8 and the normal sintered section 7 by providing a layer of valve action metallic powder (C) 9 between the valve action metallic powder (A) 1 and the valve action metallic powder (B) 4 in the embodiment 1. At this time, particle diameter of the valve action metallic powder (C) 9 takes intermediate value of respective primary powder particle diameters of the valve action metallic powder (A) 1 and the valve action metallic powder (B) 4. For instance, it is effective that powder of particle diameter 200 to 400 nm is selected for the valve action metallic powder (C) 9.

Next, operation of the embodiment 2 will be described in detail referring to FIGS. 9A to 9E.

Figure 9A:
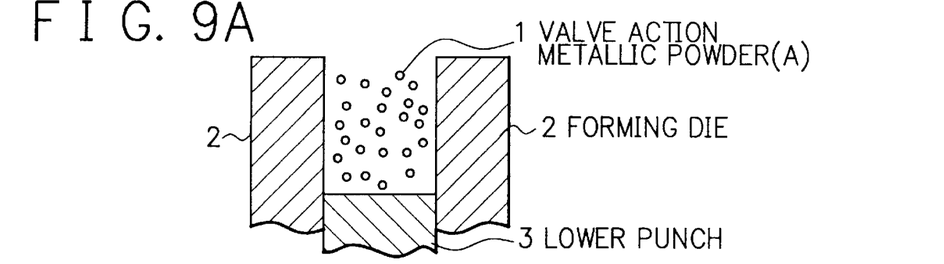
FIGS. 9A to 9E are process view showing manufacturing method of the anode body of the solid electrolytic capacitor according to the embodiment 2 of the present invention.

Firstly, the first valve action metallic powder (A) 1 corresponding to the weight of the main anode body is thrown into the concave portion bounded by the die 2 of the press forming metal and the lower punch 3 inserted thereto (FIG. 9A).

Figure 9B:
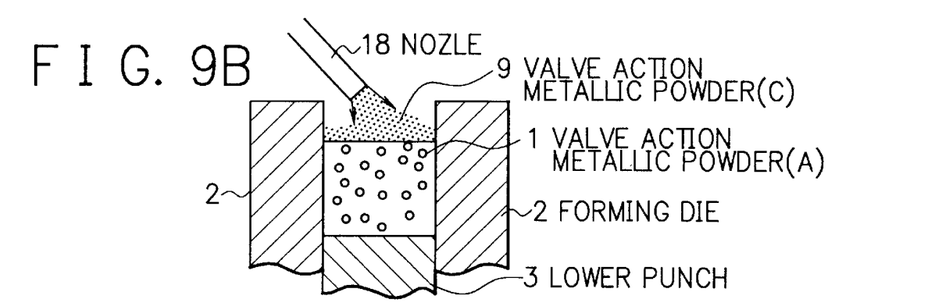

Next, there is thrown the second valve action metallic powder (C) 9 with intermediate particle diameter on the valve action metallic powder (A) 1 by means of a nozzle 18 and so forth. At this time, the thrown weight of the valve action metallic powder (C) 9 is about 1% to 10% of the thrown weight of the valve action metallic powder (A) 1 (FIG. 9B).

Figure 9C:
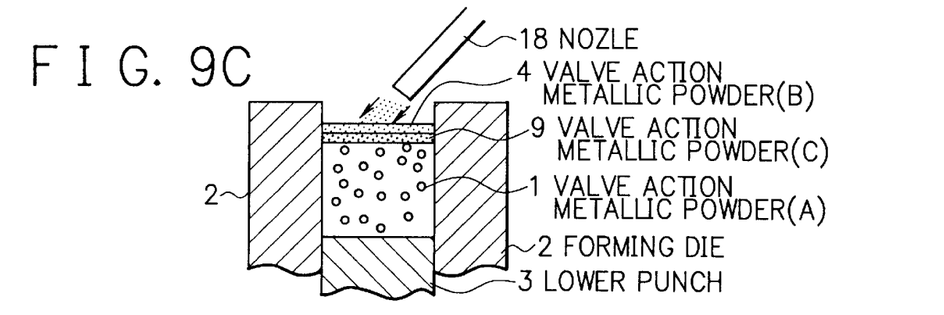

Next, there is thrown the third valve action metallic powder (B) 4 with fine particle diameter on the valve action metallic powder (C) 9 by means of a nozzle 18 and so forth. At this time, the thrown weight of the valve action metallic powder (B) 4 is about 1% to 10% of the thrown weight of the valve action metallic powder (A) 1 (FIG. 9C).

Figure 9D:
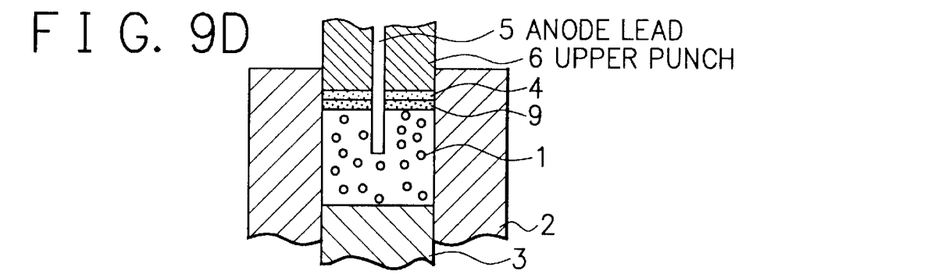

Next, there is implemented press manufacturing such that it causes the upper punch 6 and the lower punch 3 to approach under the condition that the anode lead 5 is bedded in the valve action metallic powder (A) 1, and penetrated to be embedded through the valve action metallic powder (C) 9 and the valve action metallic powder (B) 4 (FIG. 9D).

Figure 9E:
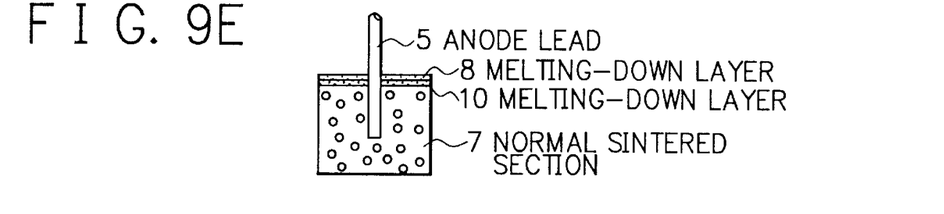

Subsequently, sintering is implemented under the condition of high temperature and high vacuum such as 1000 to 2000° C., and less than $10^{-3}$ Torr. In this sintering process, the sintering conditions such as temperature, and heating time and so forth are established in such a condition that the valve action metallic powder (A) 1 is sintered such that the melting-down state has appropriate surface area corresponding to capacity which is set to the solid electrolytic capacitor. For this reason, the valve action metallic powder (B) 4 whose particle diameter is smaller than that of the valve action metallic powder (A) 1 forms the melting-down layer 8 of high strength formed body covering whole embedded surface of the anode lead 5, after coming to be the state close to the plate consisting of the valve action metal while proceeding remarkably the melting-down state by the sintering process. The valve action metallic powder (C) 9 with the intermediate particle diameter forms melting-down layer 10 between the normal sintered section 7 and the melting-down layer 8 while melting to a degree intermediate the melted conditions of the valve action metallic powder (A) 1 and the valve action metallic powder (B) 4 (FIG. 9E).

According to the embodiment 2, the invention is capable of achieving an improvement in embedded strength of the anode lead 5 and prevention of damage of the anode body causing leakage current by virtue of formation of the melting-down layer 8 of the high strength formed body similar to the above described embodiment 1. Furthermore, it is capable of preventing the situation where the valve action metallic powder (A) 1 and the valve action metallic powder (B) 4 come off because of occurrence of stress therebetween or where a crack occurs therebetween, by virtue of arrangement of the valve action metallic powder (C) 9 between the valve action metallic powder (A) 1 and the valve action metallic powder (B) 4 when difference of degree of the melting-down state in the sintering process is remarkably large between the valve action metallic powder (A) 1 and the valve action metallic powder (B) 4.

[EMBODIMENT 3]

FIGS. 10A to 10D are process views showing the manufacturing method of the anode body according to embodiment 3 of the present invention. In the above described embodiment 1, there is enhanced remarkably the melting-down characteristic in the neighborhood of embedded surface of the anode lead to strengthen the strength of the formed body in the neighborhood of the embedded surface of the anode lead by using two kinds of the same valve action metallic powder whose particle diameter is different. On the other hand, in the present embodiment 3, there is enhanced the melting-down characteristic in the neighborhood of embedded surface of the anode lead to strengthen the strength of the formed body in the neighborhood of the embedded surface of the anode lead by using two kinds of the valve action metallic powder whose melting point is different.

Figure 10A:
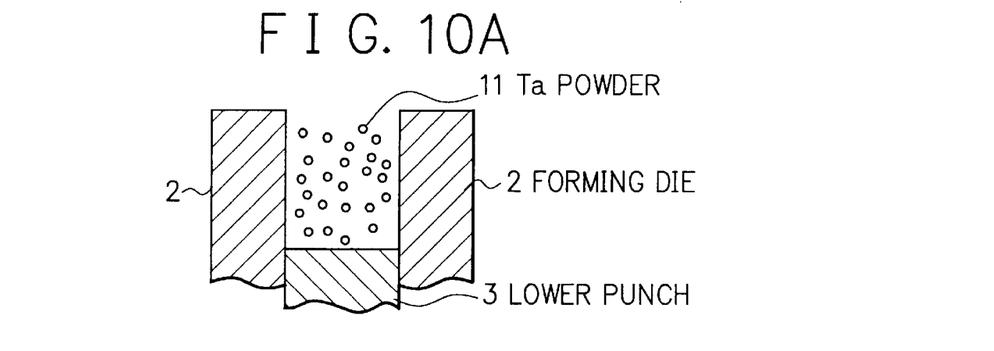
FIGS. 10A to 10D are process view showing manufacturing method of the anode body of the solid electrolytic capacitor according to an embodiment 3 of the present invention.

Firstly, the Tantalum powder 11 (melting point 2990° C.); with a primary powder particle diameter of about 0.5 to scores of $\mu$m; for instance, approximately 1.0 $\mu$m corresponding to the weight of the main anode body is thrown into the concave portion bounded by the die 2 of the press forming metal and the lower punch 3 inserted thereto (FIG. 10A).

Figure 10B:
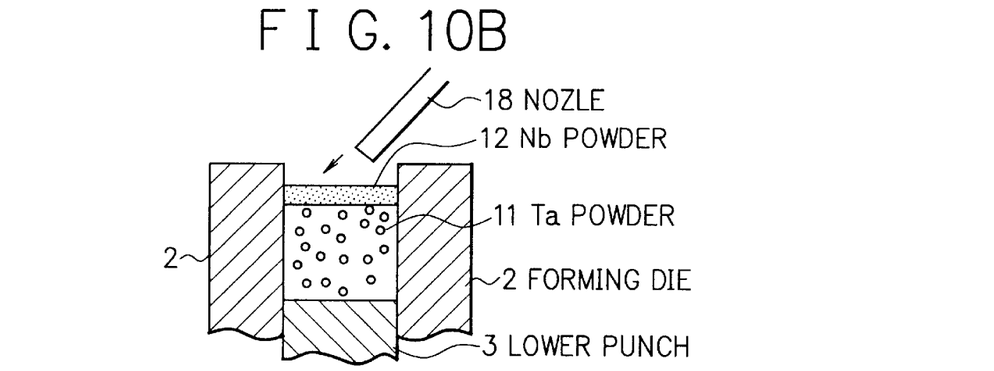

Next, the Niobium powder 12 (melting point 2470° C.) whose primary powder particle diameter is of the degree of 0.5 to scores of $\mu$m, is thrown on the Tantalum powder 11 by means of a nozzle 18 and so forth. At this time, thrown weight of the Niobium powder 12 is of the degree of 0.1% to 10% of the thrown weight of the Tantalum powder 11 (FIG. 10B).

Figure 10C:
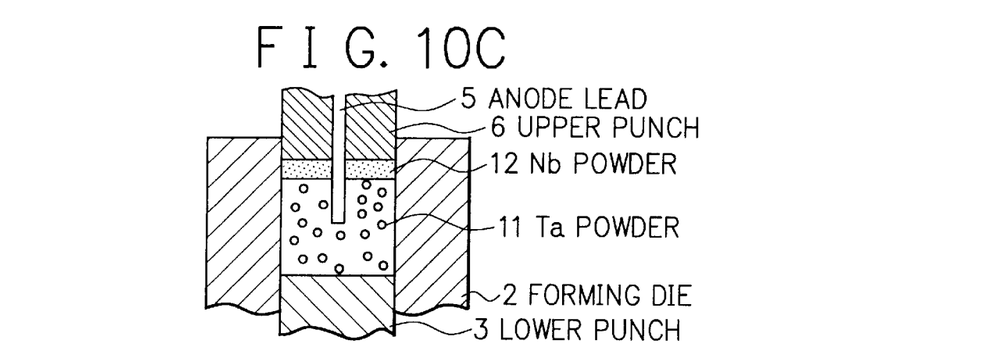

Next, there is implemented press manufacturing such that it causes the upper punch 6 and the lower punch 3 to approach under the condition that the anode lead 5 is bedded in the Tantalum powder 11, and penetrated to be embedded through the layer of Niobium powder 12 (FIG. 10C).

Figure 10D:
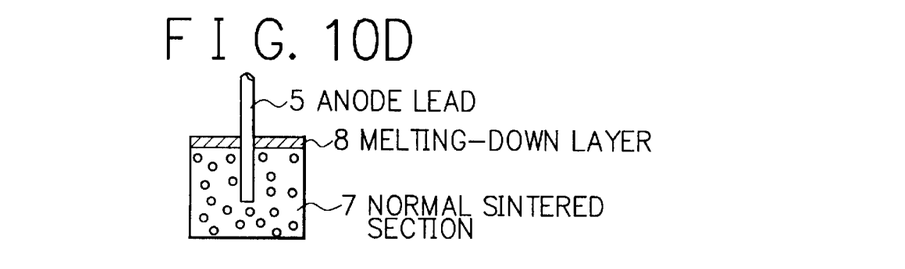
Figure 11A:
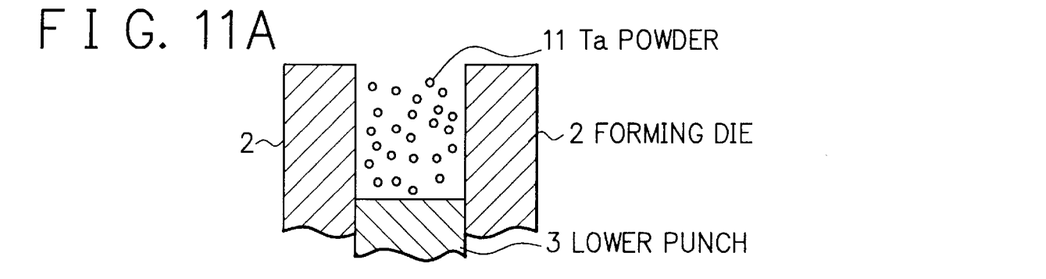
FIGS. 11A to 11E are process view showing manufacturing method of the anode body of the solid electrolytic capacitor according to an embodiment 4 of the present invention.
Figure 11B:
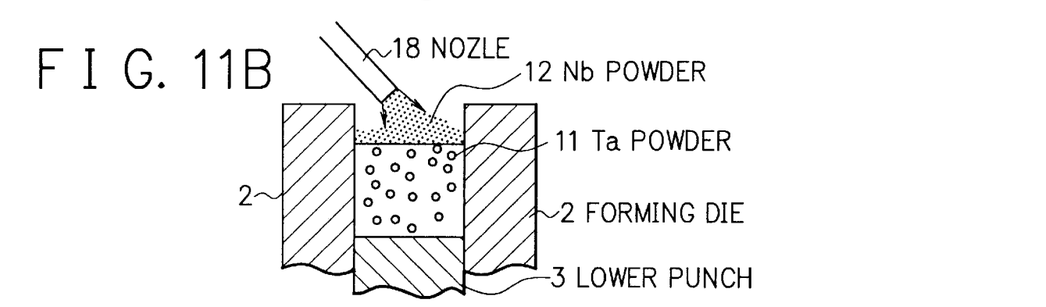
Figure 11C:
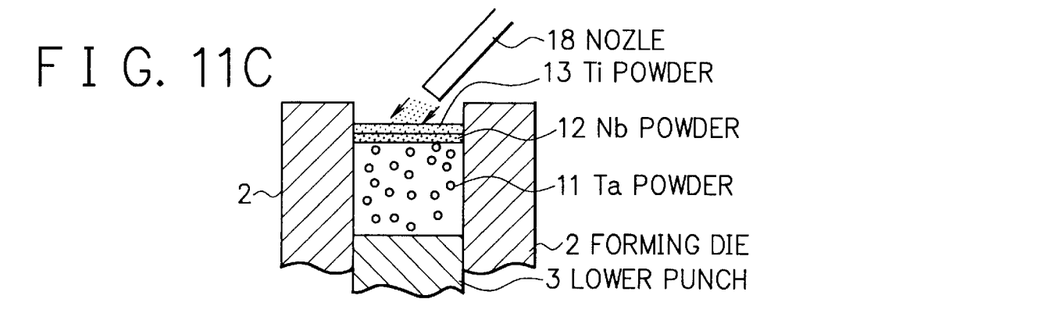
Figure 11D:
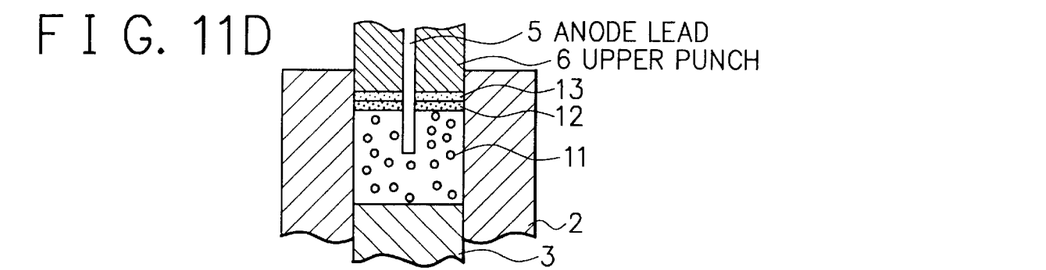
Figure 11E:
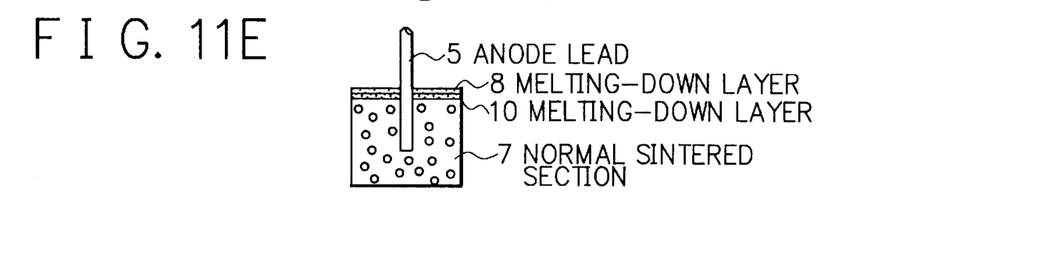

Subsequently, sintering is implemented under the conditions of high temperature and high vacuum such as 1000 to 2000° C., and less than $10^{-3}$ Torr to the formed body for a heating time period of scores of minutes. In this sintering process, the sintering condition such as temperature, and heating time and so forth are established in such a condition that the Tantalum powder 11 is sintered such that the melting-down state has appropriate surface area corresponding to a capacity which is set to the solid electrolytic capacitor. In such sintering process, the Niobium powder 12 whose melting point is lower than that of the Tantalum powder 11 forms the melting-down layer 8 of high strength formed body covering whole embedded surface of the anode lead 5, after coming to be the state close to the plate consisting of the Niobium while proceeding remarkably the melting-down state by the sintering process in comparison with the Tantalum powder 11 (FIG. 10D).

The melting-down layer 8 strongly locks with the anode lead 5 from remarkable melting, and also strongly locks with normal sintered section 7 brought. Thus, embedded strength of the anode lead 5 is improved greatly. It is also capable of achieving prevention of deterioration of characteristic of the leakage current and so forth.

[EMBODIMENT 4]

FIGS. 11A to 11E are process views showing the manufacturing method of the anode body of the solid electrolytic capacitor according to embodiment 4 of the present invention. In the embodiment 4, a 3-layer structure of valve action metallic powder is used similar to the above described embodiment 2. The Tantalum powder 11 (melting point 2990° C.), the Niobium powder 12 (melting point 2470° C.), and Titanium powder 13 (melting point 1660° C.) with different melting points instead of the same metals are used. Further, the respective powders are that primary powder particle diameter is with a degree of 0.5 to scores of $\mu$m, for instance, approximately 1.0 $\mu$m particle diameter is usable. It is also capable of using only Titanium powder 13 whose primary powder particle diameter is large while considering that the melting point of the Titanium powder 13 is particularly low. Although such method is used, it is capable of achieving improvement of embedded strength of the anode lead and prevention of damage of the anode body causing leakage current by virtue of formation of the melting-down layer of the high strength formed body similar to the above described embodiment 2. Furthermore, it is capable of preventing the situation where breaking off occurs because of the occurrence of stress of between the upper layer and lower layer or where a crack occurs therebetween, by virtue of an arrangement of large differences of degree of the melting-down state in the sintering process.

[EMBODIMENT 5]

Figure 12A:
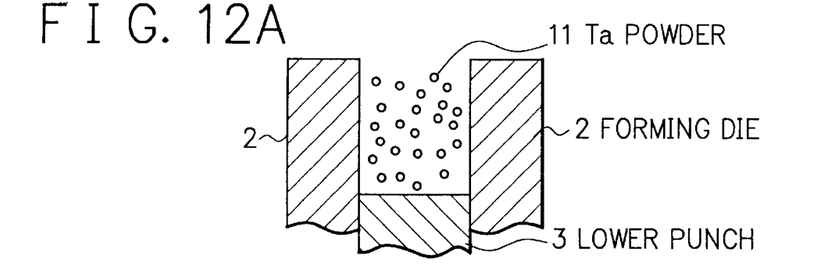
FIGS. 12A to 12E are process view showing manufacturing method of the anode body of the solid electrolytic capacitor according to an embodiment 5 of the present invention.
Figure 12B:
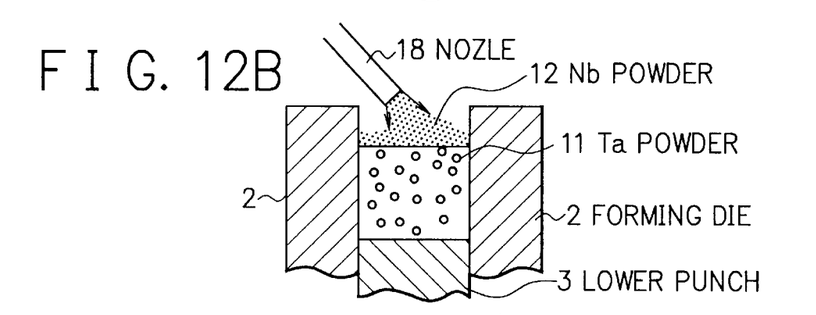
Figure 12C:
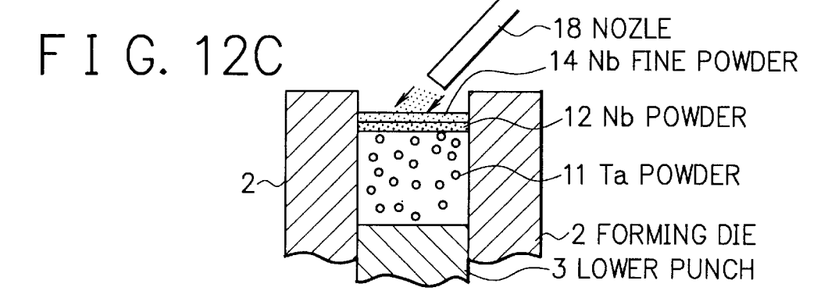
Figure 12D:
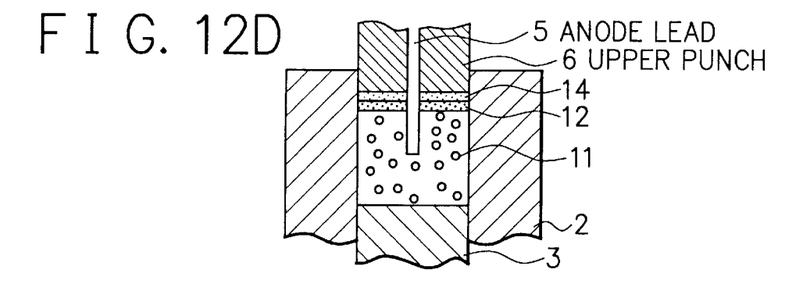
Figure 12E:
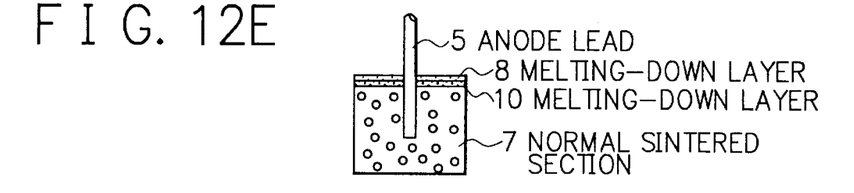

FIGS. 12A to 12E are process views showing the manufacturing method of the anode body of the solid electrolytic capacitor according to embodiment 5 of the present invention. In embodiment 5, a 3-layer structure of valve action metallic powder is used similar to the above described embodiments 2 and 4. The Tantalum powder 11 (melting point 2990° C.), the Niobium powder 12 (melting point 2470° C.), and Niobium fine powder 14 (melting point 2470° C.) each with a different melting point are used. In FIG. 12C, there are arranged the Niobium fine powder 14, the Niobium powder 12, and the Tantalum powder 11 successively from the up side, namely the respective powders are arranged so that the higher melting-down characteristic material has the upper position toward the embedded surface of the anode lead. Although such method is used, it is capable of achieving improvement of embedded strength of the anode lead and prevention of damage of the anode body causing leakage current by virtue of formation of the melting-down layer of the high strength formed body similar to the above described embodiment 2. Furthermore, it is capable of preventing the situation where breaking off occurs because of occurrence of stress between the upper layer and the lower layer or where a crack occurs therebetween, by virtue the large difference the melting-down states in the sintering process.

As described above, in accordance with the first aspect of the manufacturing method, there are used more than two kinds of the valve action metallic powder whose melting-down properties are different. The valve action metallic powders are thrown into the press manufacturing die successively so as to be arranged with the valve action metallic powder whose melting down property is high in the neighborhood of embedded surface of the anode lead. There is implemented pressurized formation by one time press manufacturing, before forming the anode body by implementing above described sintering process. Thus there is formed high strength section of formed body in the neighborhood of embedded surface portion of the anode lead caused by remarkable melting-down in the sintering process. The anode lead of this section and the circumference are strongly fixed. It becomes possible to greatly improve embedded strength of the anode lead in the anode body. The invention is capable of preventing deterioration of characteristic of the solid electrolytic capacitor such as leakage current and so forth caused by outer stress. It is also capable of implementing manufacture of the anode body efficiently without necessity of a plurality of press manufacturing, so that it becomes possible to greatly reduce time and cost of manufacturing of the anode body of the solid electrolytic capacitor.

In accordance with the second aspect of the manufacturing method of the anode body of the solid electrolytic capacitor, there is implemented press manufacturing while throwing more than two kinds of the same valve action metallic powder whose particle diameter is different successively such that the valve action metallic powder whose particle diameter is fine is arranged in the neighborhood of embedded surface of the anode lead, when there is implemented press manufacturing while throwing the valve metallic powder into the press manufacturing die. The valve action metallic powder whose particle diameter is fine represents remarkable melting-down property in the sintering process. Thereby, it becomes possible to greatly improve embedded strength of the anode lead in the anode body. It is capable of preventing deterioration of characteristic of the solid electrolytic capacitor such as the leakage current and so forth caused by the outer stress.

In accordance with the third aspect of the manufacturing method of the anode body of the solid electrolytic capacitor, there is used fine powder whose primary powder particle diameter ranges from more than 10 nm to less than 1 $\mu$m by way of the valve action metallic powder arranged in the neighborhood of embedded surface of the anode lead. In the above-described sintering process, there is formed the valve action metallic body with high strength of formed body on the ground that the valve action metallic powder arranged in the neighborhood of embedded surface of the anode lead is melted down to collapse sufficiently. There is implemented the sintering process such that the valve action metallic body is strongly fixed to the anode lead and another portion of the anode body. It becomes possible to greatly improve embedded strength of anode lead in the anode body on the ground of remarkable melting-down property in the sintering process of the fine powder. It is capable of preventing deterioration of characteristic of the solid electrolytic capacitor such as the leakage current and so forth caused by the outer stress.

In accordance with the fourth aspect of the manufacturing method of the anode body of the solid electrolytic capacitor, there are used two kinds of valve action metallic powders, such as the valve action metallic powder arranged in the neighborhood of embedded surface of the anode lead, and the valve action metallic powder whose primary powder particle diameter is from more than 0.5 µm to less than 100 µm. It is capable of achieving improvement of embedded strength of the anode lead and prevention of deterioration of characteristic such as the leakage current and so forth.

In accordance with the fifth aspect of the manufacturing method of the anode body of the solid electrolytic capacitor, there are used the valve action metallic powder arranged in the neighborhood of embedded surface of the anode lead, the valve action metallic powder whose primary powder particle diameter is from more than 0.5 µm to less than 100 µm, and the valve action metallic powder whose primary powder particle diameter is intermediate therebetween and arranged between above two valve action metallic powders. Three kinds of valve action metallic powders in total are used. It is capable of preventing the situation where the valve action metallic powder whose primary powder particle diameter is from 0.5 µm to 100 µm and the valve action metallic powder arranged in the neighborhood of the embedded surface break off because of the occurrence of stress therebetween or where a crack occurs therebetween, by virtue of arrangement of the valve action metallic powder whose primary powder particle diameter is intermediate of the two powders between above two valve action metallic powders when difference of degree of the melting-down state in the sintering process is remarkably large between the two valve action metallic powders.

In accordance with the sixth aspect of the manufacturing method of the anode body of the solid electrolytic capacitor, since there is used Tantalum by way of the same metal, it is capable of being obtained the effect of respective aspects by using Tantalum which is the valve action metallic powder used generally.

In accordance with the seventh aspect of the manufacturing method of the anode body of the solid electrolytic capacitor, there is implemented press manufacturing in such a way that when the press manufacturing is implemented while throwing the valve action metallic powder into the press manufacturing die, more than two kinds of the valve action metallic powder whose melting points are different are thrown so as to be arranged with the valve action metallic powder whose melting point is low in the neighborhood of the embedded surface of the anode lead successively. It becomes possible to greatly improve embedded strength of anode lead in the anode body on the ground of remarkable melting-down property in the sintering process of the valve action metallic powder whose melting point is low. It is capable of preventing deterioration of characteristic of the solid electrolytic capacitor such as the leakage current and so forth caused by the outer stress.

In accordance with the eighth aspect of the manufacturing method of the anode body of the solid electrolytic capacitor, there are used two kinds of the valve action metallic powders of Niobium powder and Tantalum powder by way of the valve action metallic powders arranged in the neighborhood of the embedded surface of the anode lead. It becomes possible to improve embedded strength of anode lead in the anode body on the ground of remarkable melting-down property in the sintering process of the Niobium metallic powder whose melting point is low with the minimum process and constitution. It is capable of preventing deterioration of characteristic of the solid electrolytic capacitor such as the leakage current and so forth caused by the outer stress.

In accordance with the ninth aspect of the manufacturing method of the anode body of the solid electrolytic capacitor, there are used the titanium powder as the valve action metallic powder arranged in the neighborhood of embedded surface of the anode lead, the Tantalum powder and the Niobium powder arranged between above two valve action metallic powders. Three kinds of valve action metallic powders in total are used. It is capable of achieving improvement of the embedded strength of the anode lead of the anode body and prevention of the leakage current. It is capable of preventing the situation where the Tantalum powder and titanium powder arranged in the neighborhood of the embedded surface come off because of occurrence of stress therebetween or where a crack occurs therebetween, by virtue of the arrangement of the Niobium powder whose melting point is intermediate of the two powders between above two valve action metallic powders when the difference of degree of the melting-down state in the sintering process is remarkably large between the two valve action metallic powders.

While preferred embodiments of the invention have been described using specific terms, such description is for illustrative purpose only, and it is to be understood that changes and variations may be made without departing from the spirit or scope of the following claims.

What is claimed is:

1. A method of manufacturing an anode body of a solid electrolytic capacitor in which the anode body is formed by press manufacturing of valve action metallic powders having been thrown into a press manufacturing die, said method comprising the steps of:

throwing a first valve action metallic powder with a first sintering melting-down property into a press manufacturing die;

without pressing the first valve action metallic powder, throwing a second valve action metallic powder with a second sintering melting-down property into the press manufacturing die so that the one of the first and second valve action metallic powders with the larger melting-down property is arranged in the neighborhood of an embedded surface of an anode lead;

in a single pressing step, pressing the first and second valve action metallic powders into a single pressed body; and sintering the pressed body to form an anode body.

2. The method of manufacturing an anode body of claim 1, wherein the first valve action metallic powder and the second valve action metallic powder are of the same metal, the first valve action metallic powder comprising of first diameter particles, and the second valve action metallic powder comprising of second diameter particles, and wherein the one of the first and second valve action metallic powders with the finer diameter particles is arranged in the neighborhood of the embedded surface of the anode lead.

3. The method of manufacturing an anode body of claim 2, wherein the finer diameter particles range from more than 10 nm to less than 1 micrometer; and wherein said sintering step transforms the one of the first and second valve action metallic powders with the finer diameter particles into a first anode body section firmly fixed to the anode lead and transform the other of the first and second valve action metallic powders into a second main anode body section firmly fixed to the first anode body section to form a high-strength metallic body.

4. The method of manufacturing an anode body of claim 3, wherein said method consists of using only two metallic powders, the first of the only two metallic powders being the one of the first and second valve action metallic powders with the finer diameter particles arranged in the neighborhood of the embedded surface of the anode lead, and the second of the only two metallic powders comprising a primary powder particle diameter ranging from more than 0.5 micrometers to less than 100 micrometers.

5. The method of manufacturing an anode body of claim 3, comprising the further step of, without pressing the first or second valve action metallic powders, throwing a third valve action metallic powder with a third sintering melting-down property into the press manufacturing die intermediate the first and second valve action powders, wherein the one of the first and second valve action metallic powders with the larger melting-down property is arranged in the neighborhood of an embedded surface of an anode lead, the third valve action metallic powder is arranged adjacent the one of the first and second valve action metallic powder and the other of the first and second valve action metallic powders is adjacent the third valve action powder, and wherein the other of the first and second valve action metallic powder comprises a primary powder with a particle diameter ranging from more than 0.5 micrometers to less than 100 micrometers, and the third valve action metallic powder comprises a primary powder with a particle diameter intermediate the particle diameter of the first and second valve action metallic powders.

6. The method of manufacturing an anode body of claim 2, wherein said metal is Tantalum.

7. The method of manufacturing an anode body of claim 1, wherein the first valve action metallic powder and the second valve action metallic powder are of different metals with different melting points, the first valve action metallic powder comprising of particles with a first melting point, and the second valve action metallic powder comprising of particles with a second melting point, and wherein the one of the first and second valve action metallic powders with the lower melting point particles is arranged in the neighborhood of the embedded surface of the anode lead.

8. The method of manufacturing an anode body of claim 7, wherein Niobium powder is used as the one of the first and second valve action metallic powders with the lower melting point particles arranged in the neighborhood of the embedded surface of the anode lead, and Tantalum powder is used as the other of the first and second valve action metallic powders.

9. The method of manufacturing an anode body of claim 7, comprising the further step of, without pressing the first or valve action metallic powders, throwing a third valve action metallic powder with a third sintering melting-down property into the press manufacturing die adjacent the second valve action metallic powder, wherein the one of the first and second valve action metallic powders with the larger melting-down property arranged in the neighborhood of an embedded surface of an anode lead comprises Titanum powder, the other of the first and second valve action metallic powders comprises Niobium powder, and the third valve action metallic powder comprises Tantalium.

* * * * *